United States Patent
Mihály et al.

(10) Patent No.: US 11,889,409 B2
(45) Date of Patent: Jan. 30, 2024

(54) METHOD OF AND A DEVICE FOR OPERATING NETWORK GATEWAY SERVICES IN A SERVICE BASED TELECOMMUNICATIONS SYSTEM

(71) Applicant: Telefonaktiebolaget LM Ericsson (publ), Stockholm (SE)

(72) Inventors: Attila Mihály, Dunakeszi (HU); György Miklós, Pilisborosjenö (HU); Maria Cruz Bartolomé Rodrigo, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 84 days.

(21) Appl. No.: 17/252,557

(22) PCT Filed: Jun. 15, 2018

(86) PCT No.: PCT/EP2018/066013
§ 371 (c)(1),
(2) Date: Dec. 15, 2020

(87) PCT Pub. No.: WO2019/238249
PCT Pub. Date: Dec. 19, 2019

(65) Prior Publication Data
US 2021/0258872 A1    Aug. 19, 2021

(51) Int. Cl.
*H04W 48/18* (2009.01)
*H04W 8/02* (2009.01)
(Continued)

(52) U.S. Cl.
CPC ............. *H04W 48/18* (2013.01); *H04W 8/02* (2013.01); *H04W 60/00* (2013.01); *H04W 88/16* (2013.01); *H04W 88/18* (2013.01)

(58) Field of Classification Search
CPC ....... H04W 48/18; H04W 8/02; H04W 60/00; H04W 88/16; H04W 88/18; H04W 88/14; H04W 92/045
See application file for complete search history.

(56) References Cited

U.S. PATENT DOCUMENTS 11,019,495 B2 * 5/2021 Ito ................. H04W 12/041
2019/0021064 A1   1/2019 Ryu et al.
(Continued)

FOREIGN PATENT DOCUMENTS

EP    2611085 A1    7/2013
EP    3598804 A1    1/2020
(Continued)

OTHER PUBLICATIONS

International Search Report and the Written Opinion of the International Searching Authority, issued in corresponding International Application No. PCT/EP2018/066013, dated Feb. 22, 2019, 13 pages.
(Continued)

*Primary Examiner* — Marisol Figueroa
(74) *Attorney, Agent, or Firm* — Rothwell, Figg, Ernst & Manbeck, P.C.

(57) ABSTRACT

A dedicated Network Gateway Service (NGS) (22, 23) in a Service Based Architecture (SBA) domain (21), deployed in a core network of a telecommunications system (20), arranged for operational message handling with communication entities (2, 3, 4) of the telecommunications system external of the SBA domain (21) in accordance with communication interface protocols (N1, N2, N4) of the telecommunications system (20). The NGS (22, 23) is further arranged for service message handling in the SBA domain (21) with at least one of an Access and Mobility Function
(Continued)

(AMF) (24) and a Session Management Function (SMF) (25) of the SBA domain (21).

19 Claims, 6 Drawing Sheets

(51) Int. Cl.
  *H04W 60/00* (2009.01)
  *H04W 88/16* (2009.01)
  *H04W 88/18* (2009.01)

(56) References Cited

U.S. PATENT DOCUMENTS

2019/0116631 A1* 4/2019 Talebi Fard .......... H04W 76/11
2021/0153111 A1* 5/2021 Theimer ............. H04L 12/4641

FOREIGN PATENT DOCUMENTS

| WO | 2009080589 A2 | 7/2009 |
| WO | 2018008944 A1 | 1/2018 |
| WO | 2018169070 A1 | 9/2018 |

OTHER PUBLICATIONS

3GPP TS 23.501 V15.1.0 (Mar. 2018), 3rd Generation Partnership Project; Technical Specification Group Services and System Aspects; System Architecture for the 5G System; Stage 2 (Release 15), Mar. 2018, 201 pages.

* cited by examiner

METHOD OF AND A DEVICE FOR OPERATING NETWORK GATEWAY SERVICES IN A SERVICE BASED TELECOMMUNICATIONS SYSTEM

CROSS REFERENCE TO RELATED APPLICATION(S)

This application is a 35 U.S.C. § 371 National Phase Entry Application from PCT/EP2018/066013, filed Jun. 15, 2018, designating the United States, the disclosure of which is incorporated herein by reference in its entirety.

TECHNICAL FIELD

The present disclosure generally relates to the provision of services in a telecommunications system, and more specifically to the operation of network gateway services in a Service Based Architecture, SBA, domain in core a network of a telecommunications system, such as a Fifth Generation, 5G, telecommunications system.

BACKGROUND

The Fifth Generation, 5G, telecommunications core network architecture is an example of a Service Based Architecture, SBA, in which Network Functions, NF, provide one or multiple services to entities requiring telecommunications services from a particular NF. In turn, an NF may also request telecommunications services from another NF, for example. The NFs of the Core Network, CN, are self-contained functionalities that can be modified and updated in an isolated manner, i.e. without affecting other NFs.

The concept of provision of services between entities in a telecommunications system or telecommunications network is not limited to strictly service organised architectures. The service concept may be widely used in data communication, data exchange and/or data processing environments, wherein one or multiple service producers or service providers provide services for supporting data processing by one or multiple service consumers.

The provision of (logical) communication services enables a more flexible development of new services, as it becomes possible to connect to communication entities and other system components of a telecommunications system without introducing specific new interfaces, for example.

The operational communication of the SBA domain with the outside world, i.e. the communication entities of the telecommunications system, may run through existing or still to be developed communication interface protocols arranged for operational message handling. Present point-to-point communication interface protocols for operational message handling between the SBA domain and network entities in a 5G telecommunications system are designated N1, N2 and N4, for example. Fixed access networks and Long Term Evolution, LTE, network access, for example, operate with other specific signalling protocols.

The various communication interface protocols are implemented in some of the NFs in the SBA domain. Accordingly, the NFs that implement these network communication interface protocols contain both services and their related functionality as well as network communication interface functionality. Accordingly, the interface functionality towards communication entities in a telecommunications system, such as User Equipment, UE, Radio Access Networks, RANs, and User Plane, UP, nodes is not designed on a service-based paradigm.

This means, for example, that these communication interface protocols, such as e.g. the Stream Control Transmission Protocol, SCTP, are not following the request-response paradigm of the SBA, and are also not supported by current cloud infrastructures, which in general assume Hypertext Transfer Protocol, HTTP, based communication messaging.

Several mechanisms defined for the different NFs in the Third Generation Partnership Project, 3GPP, SBA domain are influenced by the external network interfaces and the assumption of point-to-point communication, such as load balancing, overload control and Non-Access Stratum, NAS, level congestion control.

Handling "non-service based" functionality for the NFs in the SBA domain results in difficulties to reconcile current NF functionality with SBA models based on functionality implementation.

Further, the coupling of certain external interfaces to specific NFs also implies that some NFs are involved in certain transactions even if same, from a service architecture perspective, would not have any role in that transaction otherwise. For example, in a 5G SBA domain, a Protocol Data Unit, PDU, session modification procedure, from a service provision perspective, would logically involve only the Session Management Function, SMF. However, since the Access and Mobility Function, AMF, implements the interfaces N1 and N2 towards the UE and RAN, respectively, the AMF is also involved in sending NAS session management messages processed by the SMF.

Implementing the external network communication interfaces at certain NFs of the SBA compromises separation of specialized NF functionality. For example, in the case when the UE has sessions in multiple network slices, the same AMF terminating the NAS security association must handle the UE control traffic in both slices, although the two slices may require different access and mobility management, or the AMF implementation may be optimized or simplified in different ways depending on the slice.

Accordingly, there is a need for improving operational message handling between communication entities operatively connected to an SBA domain of a core network of a telecommunications system.

SUMMARY

In a first aspect of the present disclosure, there is provided a Network Gateway Service, NGS, in a Service Based Architecture, SBA, domain, deployed in a core network of a telecommunications system. The NGS is arranged for operational message handling with communication entities of the telecommunications system external of the SBA domain in accordance with communication interface protocols of the telecommunications system. The NGS is further arranged for service message handling in the SBA domain with at least one of an Access and Mobility Function, AMF, and a Session Management Function, SMF, of the SBA domain.

The present disclosure provides an independent, separate, self-contained service functionality, called network gateway service, in the SBA for operational message handling between the SBA and communication entities external of the SBA in a telecommunications system.

Allocating the communication between the SBA and its external communication environment to a separate service or services in the SBA, among others, effectively solves the interdependency problem, i.e. unnecessary couplings that exist between present Network Functions, NFs, in the SBA domain for operational message handling with the communication entities and difficulties in updating and modifying NFs providing both service and operational message handling functionality.

The NGS solution according to the present disclosure enables a more flexible and independent development and improvement of new and existing services, because the operational message handling of such services with the communication entities and other system components of a telecommunications system may now completely be handled in accordance with existing SBA models for implementing service functionality.

By the decoupling of the NFs from the different network communication interfaces, all services in the SBA domain fully benefit from SBA modelling based on object/resource/data contexts that are built around a common framework that facilitates re-usability, flexibility and extensibility of services. The role and data model for the separated services remains well-defined, i.e. there are no overlaps. It also allows for separate change in data structure and control logic for the separated services. That is, it enables independent evolution paths of the external and SBA communication. The present solution supports the migration from a system with deployed NF functionality according to the current 5G standard.

Hence, the specific, independent, self-contained operational message handling service functionality according to the present disclosure provides increased development agility in an SBA with the ultimate benefit to boost innovation.

For operating in an SBA domain, the NGS in accordance with the present disclosure provides for service message handling with at least one of an Access and Mobility Function, AMF, and a Session Management Function, SMF, of the SBA domain. Accordingly, the independent NGS as such may be physically implemented or independently processed in any NF of an SBA domain.

However, in an example of the present disclosure, the NGS is a distinct Network Function, NF, operative in the SBA domain.

The NGS functionality in general comprises interface communication protocols, such as point-to-point communication protocols, for handling, i.e. to send and receive, operational messages to and from communication entities external to the SBA domain. This may also imply handling of security aspects, assignment of identities and mapping of identities, load (re-)balancing, overload control and congestion control, for example. The NGS functionality is further arranged for handling, i.e. exchanging, service messages in the SBA domain.

In an example of the NGS according to the present disclosure for operating in a 5G architecture, for example, wherein the communication entities at least comprise a Radio Access Network, RAN, and a User Equipment, UE, operatively connected to the RAN, the operational message handling with the RAN, i.e. a node or server deployed in the RAN, is provided in accordance with core network control plane interface N2 functionality and the operational message handling with the UE is provided in accordance with core network control plane interface N1 functionality.

For handling registration requests with such a GNS, i.e. wherein the GNS is arranged for operational message handling in accordance with core network control plane interface N2 functionality and core network control plane interface N1 functionality and, for example when operating as a separate distinct NF, the NGS may be arranged for providing at least one of Global Unique Temporary UE Identity, GUTI, allocation, AMF selection and SMF selection.

For AMF and SMF selection, for example, in accordance with the present disclosure, service message handling by the GNS may involve a Network Repository Function, NRF of the SBA domain.

In another example of the NGS according to the present disclosure for operating in a 5G architecture, for example, wherein the communication entities comprise a User Plane Function, UPF, operatively connected to a Radio Access Network, RAN, of the telecommunications system, the operational message handling with the UPF is provided in accordance with core network control plane interface N4 functionality.

The core network control plane interface N1, N2 and N4 functionality are known to the person skilled in the art and specified in the Third Generation Partnership Project, 3GPP, standard 23.501, "System Architecture for the 5G system", the contents of which are included herein by reference.

Although separate or dedicated NGSs for operational message handling in accordance with core network control plane interface N1 and N2 functionality, and core network control plane interface N4 functionality, respectively, may be provided, the present disclosure also includes to integrate the N1, N2 and N4 functionality in a single NGS.

In accordance with the present disclosure, the NGS may be particularly arranged for allocating, in different service messages for the AMF and the SMF, parameters received from a communication entity, such as a UE and RAN, i.e. a node or server operating in the RAN.

In opposite direction, in accordance with the present disclosure, the NGS may be arranged for allocating, in an operational message for a communication entity, such as a UE and RAN, i.e. a node or server operating in the RAN, parameters received in different service messages from the AMF and the SMF.

In a second aspect of the present disclosure, there is provided a method of operating a Network Gateway Service, NGS, in a Service Based Architecture, SBA, domain, deployed in a core network of a telecommunications system. In operation, the NGS handling operational messages with communication entities of the telecommunications system external of the SBA domain in accordance with communication interface protocols of the telecommunications system, and the NGS further handling service messages in the SBA domain with at least one of an Access and Mobility Function, AMF, and a Session Management Function, SMF, of the SBA domain.

For operating in a 5G telecommunications system architecture, for example, wherein the communication entities at least comprise a Radio Access Network, RAN, and a User Equipment, UE, operatively connected to the RAN, the method in accordance with the present disclosure comprises operational message handling with the RAN, i.e. a node or server deployed in the RAN, in accordance with core network control plane interface N2 functionality and wherein operational messages with the UE are handled in accordance with core network control plane interface N1 functionality.

For operating in a 5G telecommunications system architecture, for example, wherein the communication entities comprise a User Plane Function, UPF, operatively connected to a Radio Access Network, RAN, of the telecommunications system, the method according to the present disclosure comprises operational messages with the UPF are handled in accordance with core network control plane interface N4 functionality.

In particular, the method according to the present disclosure comprises at least one of the steps of:

allocating, by the NGS, a Global Unique Temporary UE Identity, GUTI, to the UE;

selecting, by the NGS, an AMF, selecting, by the NGS, an SMF, allocating, by the NGS, in different service messages for an AMF and an SMF, parameters received in an operational message from a communication entity, and allocating, by the NGS, in an operational message for a communication entity, parameters received in different service messages from an AMF and an SMF.

Where appropriate, service message handling in accordance with the method of the present disclosure may involve a Network Repository Function, NRF, of the SBA domain, such as for selecting an AMF and/or an SMF.

In a third aspect of the present disclosure, a computer program product is provided, comprising a computer readable storage medium, storing instructions which, when executed on at least one processor operative in an SBA domain, cause the at least one processor to carry out processing steps for performing the services according to a respective one of the first and second aspect of the present disclosure.

It will be appreciated that the entities and modules disclosed may be implemented as separate hardware and/or software modules and entities, and controlled by or executed in a processor or the like.

The above mentioned and other features and advantages of the disclosure will be best understood from the following description referring to the attached drawings. In the drawings, like reference numerals denote identical parts or parts performing an identical or comparable function or operation.

DETAILED DESCRIPTION

Figure 1:
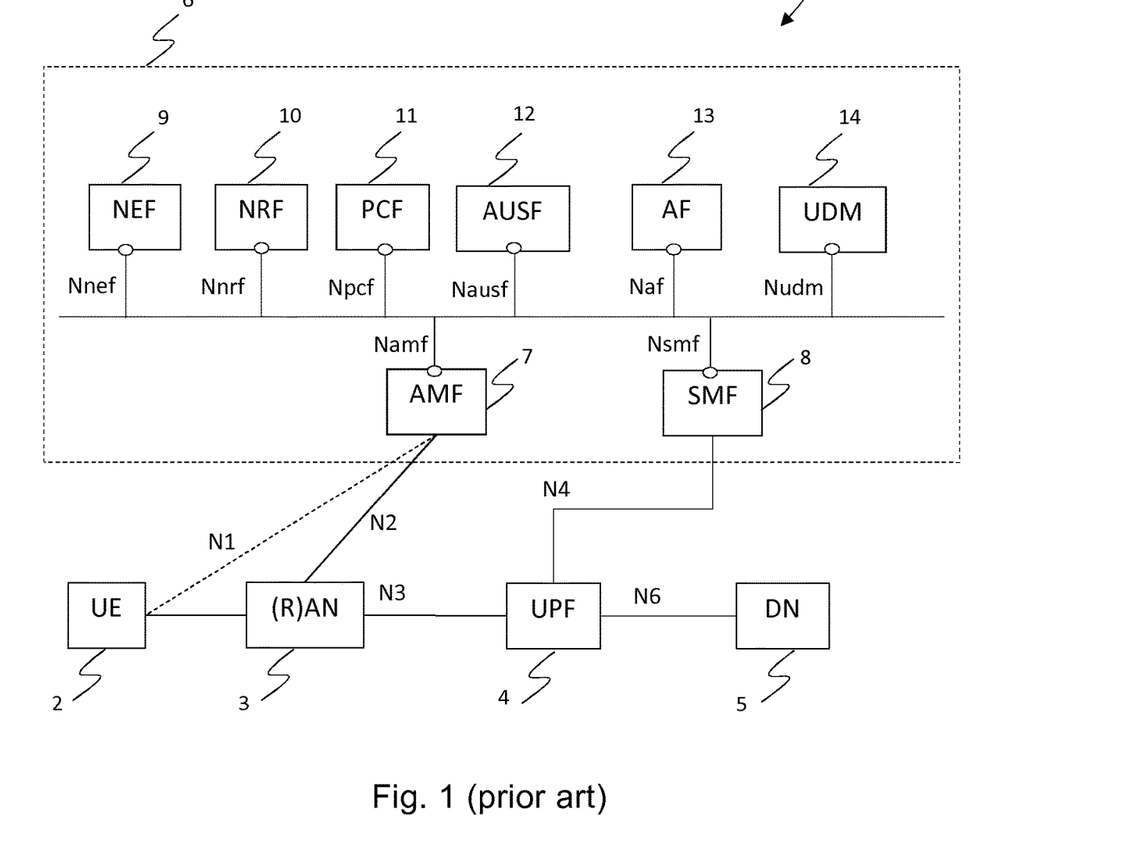
FIG. 1 schematically illustrates part of the architecture of a fifth generation, 5G, telecommunication network, according to the prior art.

FIG. 1 schematically illustrates part of the reference architecture 1 of a fifth generation, 5G, Service Based Architecture, SBA, to be deployed in a core network of a telecommunications system, in accordance with the prior art. The 5G system architecture 1 generally distinguishes the following logical Network Functions, NFs:

Authentication Server Function, AUSF, 12
Access and Mobility Management Function, AMF, 7
Network Exposure Function, NEF, 9
NF Repository Function, NRF, 10
Policy Control Function, PCF, 11
Session Management Function, SMF, 8
Unified Data Management, UDM, 14
Application Function, AF, 13.

Figure 2:
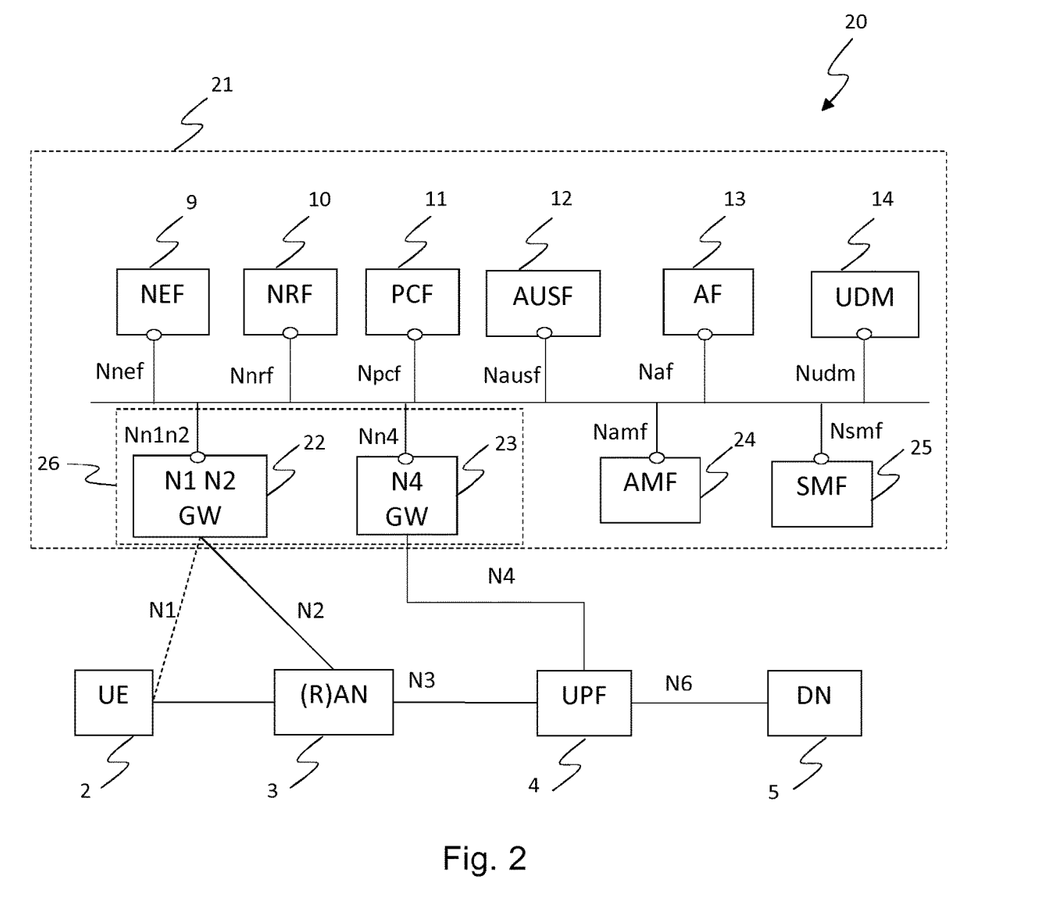
FIG. 2 schematically illustrates an embodiment of part of the architecture of a 5G telecommunication network according to the present disclosure.

The logical NFs 7-14 of the Core Network are built of one or more services and together form an SBA domain 6. Within the SBA domain 6 service messages are communicated and exchanged over respective communication interfaces, indicated by a capital N followed by one of the above-mentioned abbreviations of the NFs. That is, interface Namf is the service message communication interface towards the AMF 7, etcetera, such as indicated in FIG. 2.

Communication entities supported by the SBA 6 in the core network of a telecommunications system are generally referenced as:

User Equipment, UE, 2
(Radio) Access Network, (R)AN, 3
User Plane Function, UPF, 4
Data Network, DN, 5, for example operator services, Internet access and $3^{rd}$ party services.

Operational or signalling messages between the communication entities 2-5 and the SBA domain 6 are exchanged over respective control plane interface functionality, termed N1, N2 and N4, as shown in FIG. 1. That is, interface functionality or protocol N1 pertains to UE related operational messages, interface functionality or protocol N2 relates to RAN operational messages, i.e. exchanged with a node or server in a RAN 3, and interface functionality or protocol N4 pertains to UPF related operational messages. As the N1 related operational messages are exchanged through a RAN 3 to which a particular UE 2 operatively connects, the N1 interface in FIG. 1 is schematically indicated by a dashed line. N3 and N6 are communication interfaces between the UPF 4 and RAN 3 and DN 5, respectively.

A functional description of the above-mentioned network functions, interfaces and communication protocols is available from the Third Generation Partnership Project, 3GPP, standard 23.501, "System Architecture for the 5G system", the contents of which are included herein, by reference.

In the reference architecture shown in FIGS. 1, N1, N2 and N4 are so-called point-to-point communication interface protocols for operational message handling between the SBA domain 6 and a respective network communication entity 2, 3, 4 external of the SBA domain 6. The external communication interface protocols N1 and N2 are implemented in the AMF 7 and the external communication interface protocol N4 is implemented in the SMF 8.

Several mechanisms defined for the different NFs 7-14 in the SBA domain 6 are influenced by the external network interfaces and the assumption of point-to-point communication, such as load balancing, overload control and Non-Access Stratum, NAS, level congestion control.

As indicated in the summary part above, among others, handling of non-service based functionality for the NFs in the SBA domain results in difficulties in associating current NF functionality with SBA models based on functionality implementation, whereas linking certain external interfaces to specific NFs, i.e. the AMF and SMF, also implies that these NFs are involved in certain transactions even if same, from a service architecture perspective, would not have any role in that transaction otherwise.

FIG. 2 schematically illustrates an embodiment 20 of part of the architecture of a 5G telecommunication network according to the present disclosure, showing an SBA domain 21, comprising an extension or addition, to the service architecture of the SBA domain 6 shown in FIG. 1, by one or multiple separate or distinct services 22, 23, generally called Network Gateway Services, NGSs.

The NGSs 22, 23 are responsible for exchanging operational messages with communication or network entities 2, 3, 4 external to the SBA domain 21, and to handle respective service interactions towards a respective NF within the SBA domain 21.

In the embodiment of FIG. 2 the N1 and N2 operational message handling with the communication entities UE 2 and RAN 3 and the N4 operational message handling with the UPF 4 are performed in separate or dedicated GNSs or Gateways, N1 N2 GW 22 and N4 GW 23, respectively. If advantageous or required, a single NGS 26 with the functionalities of both N1 N2 GW 22 and N4 GW 23 may be implemented, indicated by dashed lines in FIG. 2.

In the prior art reference architecture, as shown in FIG. 1, the AMF 7 is responsible for N1 and N2 operational message handling with the UE 2 and the RAN 3. The SMF 8 is responsible for N4 operational message handling with the UPF 4. According to the present disclosure, these and other operations are now performed by the N1 N2 GW 22 and the N4 GW 23, respectively.

In the SBA domain 21 service messages are communicated and exchanged with N1 N2 GW 22 and N4 GW 23 over respective communication interfaces Nn1n2 and Nn4, respectively.

In general, separating the GW services 22, 23 from the AMF 7 and SMF 8 will also imply a functionality change for these NFs that originally implemented the interfaces towards the external world. In the embodiment of FIG. 2 the thus changed NFs are indicated as AMF 24 and SMF 25.

Additional mechanisms or operations and functionality of the SBA 21 influenced by the N1, N2 and N4 interfaces, such as load (re-)balancing, overload control and Non-Access Stratum, NAS, level congestion control, may also be implemented in the N1 N2 GW 22 and the N4 GW. Such an implementation may be performed in a manner in accordance with the current 5G communication standard, for example.

Accordingly, the NGS functionality in accordance with the present disclosure generally comprises one or more of the following:
- point-to-point protocols, such as N1, N2, N4, for sending and receiving communication messages from network entities outside the SBA domain 21;
- handling of security, assignment of identities or mapping of identities;
- protocols for sending and receiving communication messages in the SBA domain 21, in particular for service message handling in the SBA domain with at least one of the AMF 24 and the SMF 25, and
- operations relating to the communication handling by the external interfaces, such as load (re-)balancing, overload control and congestion control.

In a 5G core network SBA, examples of the service operations handled by the N1 N2 GW are:
N1MessageNotify;
N1MessageSubscribe;
N1MessageUnsubscribe;
N1 N2MessageTransfer;
N2InfoSubscribe;
N2InfoUnSubscribe, and
N2InfoNotify.

The above list is merely indicative and not exhaustive. Note that other SBA services may also be optionally defined for the N1 N2 GW 22, for example an Nn1n2Exposure service, to expose different N1 and N2 related events. Each of these service operations require internal functionality in the N1 N2 GW 22, such as N2 message processing, achieving Non-Access Stratum, NAS, transport of N1 messages over N2 interface, etc. Note that the N1 N2 GW 22 also controls parts of the UE context currently maintained by the AMF 7:
- N1 specific information: 5G Global Unique Temporary UE Identities, 5G-GUTIs, NAS security keys, NAS sequence numbers, and
- N2 specific information: AMF UE NG Application Protocol, NGAP, IDs, NGAP UE-TLNA mappings.

The modified AMF 24 functionality would then result in a Namf_Comunication service that lacks the above operations and related functionality. In addition, if the N1 N2 GW 22 is accomplished as a stand-alone NF, the Application Programming Interface, API, of the AMF 24 should include another service operation that can be invoked by the N1 N2 GW 22 in the case when requests from N1 or N2 require invocation of an AMF 24.

Figure 3:
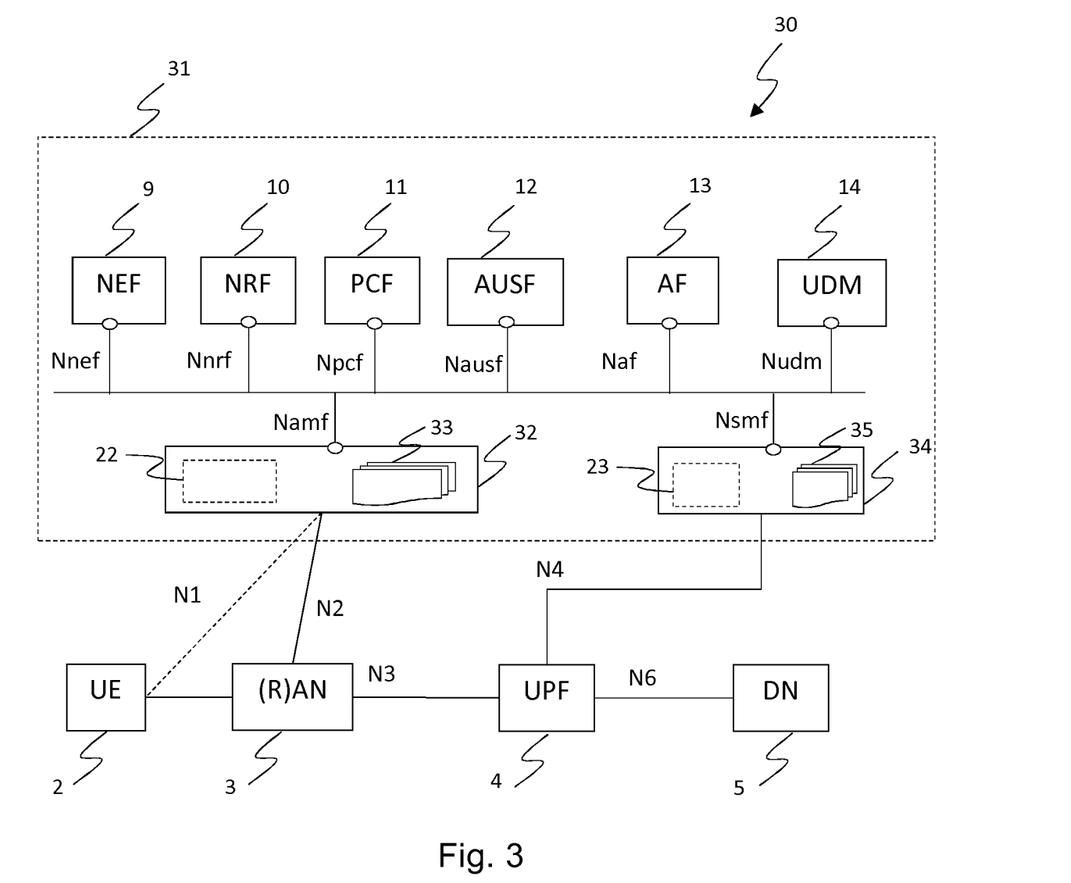
FIG. 3 schematically illustrates an embodiment of part of the architecture of a 5G telecommunication network according to the present disclosure.

FIG. 3 schematically illustrates an embodiment 30 for part of the architecture of a 5G telecommunication network according to the present disclosure. The embodiment 30 differs from the embodiment 20 in FIG. 2 in that the dedicated NGSs 22, 23 are part of the network functions 32, 34 implementing the interface functionality. It is proposed to include a physical or a logical separation between the network gateway services 22, 23 and any other services 33, 35 offered by the network functions in the SBA domain 31.

Figure 4:
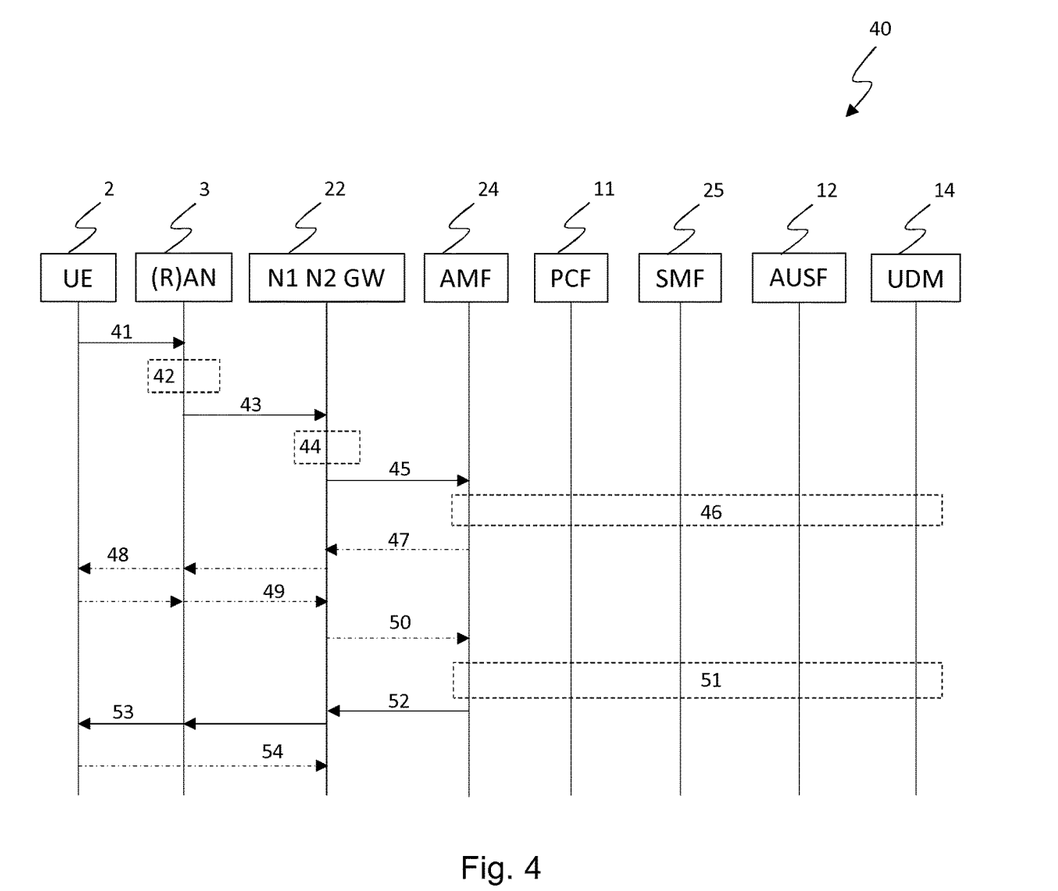
FIG. 4 schematically illustrates a procedure for registration of a User Equipment, UE, in a 5G network according to the present disclosure.

FIG. 4 schematically illustrates a procedure 40 for registration of a UE 2 in a 5G telecommunications system according to the present disclosure. The UE 2 sends a registration request 41 for becoming registered in the telecommunications system. The (R)AN 3 selects 42 an N1 N2 GW 22 with which it communicates. The registration request is then subsequently forwarded 43 to the selected N1 N2 GW 22. If required, the N1 N2 GW 22 allocates 44 a GUTI to the UE 2. The N1 N2 GW 22 also selects an AMF 24 in step 44.

In step 45, the registration request is forwarded to the selected AMF 24. It may be noted that request is forwarded 45 to the newly defined AMF 24 service operation. The AMF 24 does not communicate with communication entities external to the SBA domain 21, 31. In step 46, the system involves the PCF 11, SMF 25, AUSF 12 and the UDM 14 service functions to complete a registration procedure as is known in the prior art.

Steps 47-50 are optional and are required only when additional UE identification is required. In such a scenario, The AMF 24 requests 47 additional information, which is subsequently forwarded 48, by the N1 N2 GW 22 to the UE 2. The response containing the require additional information is transmitted back to the AMF 22 in steps 49 and 50. In case of successful registration, a registration accept message is sent 52 as a response which will be forwarded 53 by N1 N2 GW 22 towards the UE 2. The UE 2 may reply with a registration complete message 54 which will be handled by the N1 N2 GW 22 handling the GUTI of the UE 2.

Figure 5:
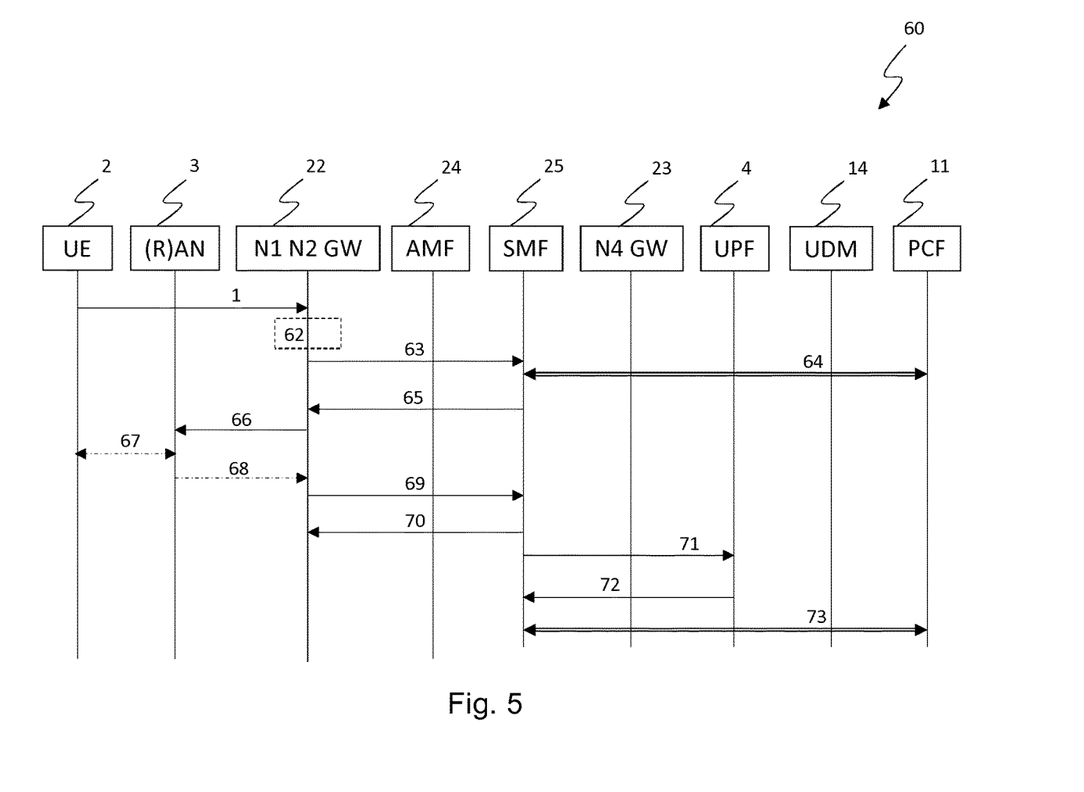
FIG. 5 schematically illustrates a procedure for Protocol Data Unit, PDU, session modification in a 5G network according to the present disclosure.

FIG. 5 schematically illustrates the procedure for Protocol Data Unit, PDU, session modification in a 5G telecommunications system according to the present disclosure. As before, the message reaches 61 the N1 N2 GW 22 first that selects 62 the SMF 25 and invokes its Nsmf_PDUSession_UpdateSMContext service. Note the difference with respect to prior art procedure in the architecture according to FIG. 1, where this is performed by the AMF 7. If there is a separate N1 N2 GW service 22 then the AMF 24 can be left out from this procedure, which otherwise operates with similar service operations, but involving the N1 N2 GW 22 instead. As a result of this, the amount of signalling will not increase for this procedure compared to the prior art. The remaining steps 64-73 are part of the standard procedure according to the prior art.

Part of the service handling by the NGS in accordance with the present disclosure may comprise allocation, in different service messages for an AMF 24 and an SMF 25, parameters received in an operational message from a respective communication entity 2, 3, 4, and allocating, by the NGS, in an operational message for a respective communication entity 2, 3, 4, parameters received in different service messages from an AMF 24 and an SMF 25.

Figure 6:
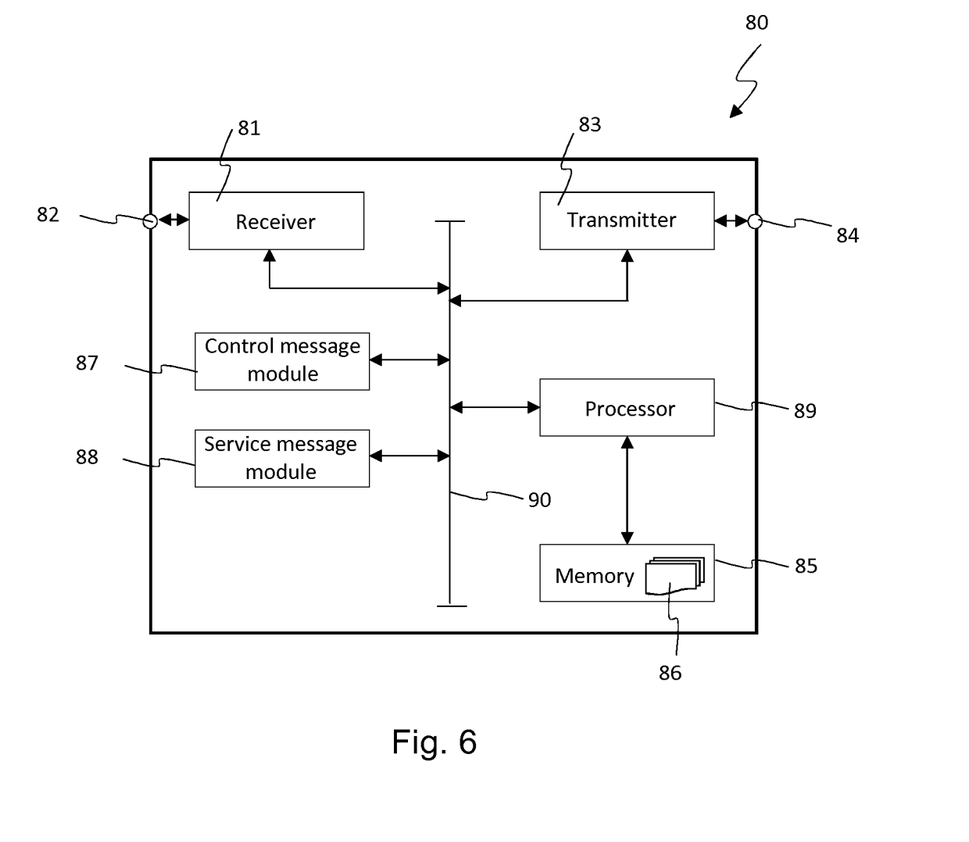
FIG. 6 schematically illustrates an implementation of a Network Gateway Service, NGS, entity according to the present disclosure.

FIG. 6 schematically illustrates a Network Gateway Service, NGS, according to the present disclosure, implemented as a separate, distinct network function NGS device or gateway 80. The control message module 87 is a part of the gateway 80 that is arranged for communicating with communication entities external to the SBA domain. Such a module may be implemented as a logical entity or a physical entity. Similarly, the service message module 88 is responsible for communicating with the other NFs within the SBA domain. Such a communication is in the form of service messages and hence the service message module 88 is accordingly named. As with the control message module 87, the service message module 88 may be implemented as a logical entity or a physical entity.

The NGS 80 further comprises a receiver 81, 82 in order to receive messages from other communication entities and Network Functions part of the telecommunications system. The NGS 80 also comprises transmitting means 83, 84 in order to transmit messages to other communication entities and Network Functions that are part of the telecommunications system. It may be noted that the NGS 80 illustrated in FIG. 6 may either be the N1 N2 GW 22 or the N4 GW 23.

The storage or memory 85 may further store context data or state information pertaining to a particular service instance, for example, and other intermediate data values and/or a computer program product which when executed by a processor 89 causes the device 80 to perform a method according to an aspect of the present disclosure. All the internal components of the device 80 communicate with one another using an internal data bus 90.

Other variations to the disclosed examples can be understood and effected by those skilled in the art in practicing the claimed disclosure, from a study of the drawings, the disclosure and the appended claims. In the claims, the word "comprising" does not exclude other elements or steps and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as optical storage medium or a solid-state medium supplied together with or as part of other hardware, but may also be distributed in other forms, such as via the internet or other wired or wireless telecommunication systems. Any reference signs in the claims should not construed as limiting scope thereof. Similar reference signs denote similar or equivalent functionality.

The present disclosure is not limited to the examples as disclosed above, and can be modified and enhanced by those skilled in the art beyond the scope of the present disclosure as disclosed in the appended claims without having to apply inventive skills and for use in any data communication, data exchange and data processing environment, for example for operational message handling between an SBA domain and fixed network access and Long Term Evolution, LTE, network access.

The invention claimed is:

1. A Network Gateway Service (NGS) in a Service Based Architecture (SBA) domain, deployed in a core network of a telecommunications system, said NGS being configured to:
    perform operational message handling with 3rd Generation Partnership Project (3GPP) communication entities of said telecommunications system external of said SBA domain in accordance with communication interface protocols of said telecommunications system; and
    perform service message handling in said SBA domain with at least one of an Access and Mobility Function (AMF) and a Session Management Function (SMF) of said SBA domain, wherein
    the NGS is separate from the AMF and the SMF,
    said 3GPP communication entities at least comprise a Radio Access Network (RAN) and a User Equipment (UE) operatively connected to said RAN,
    said operational message handling with said RAN is provided in accordance with core network control plane interface N2 functionality, and
    said operational message handling with said UE is provided in accordance with core network control plane interface N1 functionality.

2. The NGS according to claim 1, wherein
    said 3GPP communication entities comprise a User Plane Function (UPF) operatively connected to said RAN of said telecommunications system, and
    said operational message handling with said UPF is provided in accordance with core network control plane interface N4 functionality.

3. The NGS according to claim 1, wherein said NGS is arranged for allocating, in different service messages for said AMF and said SMF, parameters received in an operational message from a communication entity.

4. The NGS according to claim 1, wherein said NGS is arranged for allocating, in an operational message for a communication entity, parameters received in different service messages from said AMF and said SMF.

5. The NGS according to claim 1, wherein
    said NGS is further arranged for providing at least one of Global Unique Temporary UE Identity (GUTI) allocation and AMF selection, and SMF selection.

6. The NGS according to claim 1, wherein said NGS is arranged for service message handling involving a Network Repository Function (NRF) of said SBA domain.

7. The NGS according to claim 1, wherein
    the AMF is operatively connected to the NGS via Namf interface, and
    the SMF is operatively connected to the NGS via Nsmf interface.

8. A method of operating a Network Gateway Service (NGS) in a Service Based Architecture (SBA) domain, deployed in a core network of a telecommunications system, the method comprising:
    said NGS handling operational messages with 3GPP communication entities of said telecommunications system external of said SBA domain in accordance with communication interface protocols of said telecommunications system; and
    said NGS further handling service messages in said SBA domain with at least one of an Access and Mobility Function (AMF) and a Session Management Function (SMF) of said SBA domain, wherein the NGS is separate from the AMF and the SMF, said 3GPP communication entities at least comprise a Radio Access Network (RAN) and a User Equipment (UE) operatively connected to said RAN, said operational message handling with said RAN is provided in accordance with core network control plane interface N2 functionality, and said operational message handling with said UE is provided in accordance with core network control plane interface N1 functionality.

9. The method according to claim 8, wherein said 3GPP communication entities comprise a User Plane Function, UPF, operatively connected to said RAN of said telecommunications system, and said operational messages with said UPF are handled in accordance with core network control plane interface N4 functionality.

10. The method according to claim 8, further comprising at least one of the steps of:

allocating, by said NGS, a Global Unique Temporary UE Identity, GUTI, to said UE;

selecting, by said NGS, an AMF, selecting, by said NGS, an SMF, allocating, by said NGS, in different service messages for an AMF and an SMF, parameters received in an operational message from a communication entity, and allocating, by said NGS, in an operational message for a communication entity, parameters received in different service messages from an AMF and an SMF.

11. The method according to claim 8, wherein said service messages are handled involving a Network Repository Function (NRF) of said SBA domain.

12. The method according to claim 8, comprising:

receiving a first message that is transmitted from the UE, selecting the SMF upon receiving the first message; and transmitting towards the SMF a second message based on receiving the first message.

13. The method according to claim 12, wherein the method comprises invoking Nsmf_PDUSession_UpdateSMContext service upon receiving the first message.

14. The method according to claim 8, wherein the AMF is operatively connected to the NGS via Namf interface, and the SMF is operatively connected to the NGS via Nsmf interface.

15. A computer program product, comprising a non-transitory computer readable storage medium storing a computer program comprising instructions which, when executed on at least one processor, cause said at least one processor to carry out a method of operating a Network Gateway Service (NGS) in a Service Based Architecture (SBA) domain, deployed in a core network of a telecommunications system, the method comprising:

said NGS handling operational messages with 3GPP communication entities of said telecommunications system external of said SBA domain in accordance with communication interface protocols of said telecommunications system; and said NGS further handling service messages in said SBA domain with at least one of an Access and Mobility Function (AMF) and a Session Management Function (SMF) of said SBA domain, wherein the NGS is separate from the AMF and the SMF, said 3GPP communication entities at least comprise a Radio Access Network (RAN) and a User Equipment (UE) operatively connected to said RAN, said operational message handling with said RAN is provided in accordance with core network control plane interface N2 functionality, and said operational message handling with said UE is provided in accordance with core network control plane interface N1 functionality.

16. The NGS according to claim 1, wherein the NGS is configured to:

receive a first message that is transmitted from the UE, select the SMF upon receiving the first message, and transmit towards the SMF a second message based on receiving the first message.

17. The NGS according to claim 16, wherein the NGS is configured to invoke Nsmf_PDUSession_UpdateSMContext service upon receiving the first message.

18. The computer program product according to claim 15, wherein the method comprises:

receiving a first message that is transmitted from the UE, selecting the SMF upon receiving the first message; and transmitting towards the SMF a second message based on receiving the first message.

19. The computer program product according to claim 15, wherein the AMF is operatively connected to the NGS via Namf interface, and the SMF is operatively connected to the NGS via Nsmf interface.

* * * * *